United States Patent [19]

Hembree

[11] 3,894,442
[45] July 15, 1975

[54] SEMI-AUTOMATIC ELECTRIC GEAR SHIFTING APPARATUS FOR A MOTORCYCLE

[76] Inventor: Ray Hembree, 5920 Olive Ave., Long Beach, Calif. 90805

[22] Filed: Apr. 15, 1974

[21] Appl. No.: 461,263

[52] U.S. Cl. ............ 74/335; 74/473 R; 200/61.91; 200/61.85
[51] Int. Cl.² ............... B60K 20/10; G05G 9/00; H01H 3/16; H01H 9/06
[58] Field of Search ........... 74/473 R, 473 SW, 496, 74/503, 126, 335; 335/268; 310/23; 200/61.85, 61.86, 61.88, 61.89, 61.91

[56] References Cited
UNITED STATES PATENTS

| 2,621,533 | 12/1952 | Schotz | 74/335 |
| 3,049,934 | 8/1962 | Butler et al. | 74/473 X |
| 3,068,952 | 12/1962 | Pilkington et al. | 74/335 X |
| 3,277,734 | 10/1966 | Bernard | 74/335 |
| 3,452,253 | 6/1969 | Seidlitz | 335/268 X |
| 3,460,081 | 8/1969 | Tillman | 335/268 X |
| 3,577,789 | 5/1971 | Sansam | 74/335 X |
| 3,748,417 | 7/1973 | Morino et al. | 200/61.91 |
| 3,763,713 | 10/1973 | Ford et al. | 310/23 X |
| 3,766,793 | 10/1973 | Knop | 74/335 |
| 3,805,003 | 4/1974 | Rennels | 200/61.85 X |

Primary Examiner—Samuel Scott
Assistant Examiner—Lance W. Chandler
Attorney, Agent, or Firm—Charles A. Goodall

[57] ABSTRACT

A semi-automatic electric gear shifting apparatus for use in shifting gears in gear boxes of motorcycles and the like gear boxes wherein gears are shifted by rotating a spindle operably connected to a ratchet type gear shifting means. The said gear shifting apparatus comprises a lever arm connected at one end thereof to said spindle and connected at its other end to a toe pedal means. An actuating rod is operatively connected to said toe pedal, and the rod is reciprocated to move said lever arm and thus said spindle by a solenoid which is actuated selectively by a pair of push button switches mounted on the handle bar of the motorcycle.

4 Claims, 11 Drawing Figures

PATENTED JUL 15 1975

3,894,442

SEMI-AUTOMATIC ELECTRIC GEAR SHIFTING APPARATUS FOR A MOTORCYCLE

BACKGROUND OF THE INVENTION

1. Field of the Invention

The present invention relates to semi-automatic electric gear shifting apparatus for use in shifting gears in gear boxes of motorcycles and the like, wherein gears are shifted by rotating a spindle operably connected to a ratchet type gear shifting means, said spindle being rotated through a relatively small arc, the number of degrees of the arc being determined by the distance the ratchet means is required to move in effecting a change in the gears in the gear box. The spindle is thereafter returned to an original neutral position, said ratchet means being disengaged from the gear changing means during said return of said spindle to said original neutral position. In accordance with the present invention, the gear shifting apparatus comprises, in combination, a shifting lever arm operably connected at one end thereof to the spindle and connected at its opposite end to a cylindrical toe pedal means parallel to said lever arm. An electric drive means is provided for moving the lever arm and spindle and includes a connecting rod connected to said toe pedal means, switching means mounted on the handle bar of the motorcycle, and a solenoid electrically connected to a power source through said switches. The electric gear shifting apparatus when energized selectively through said switches imparts a rotational force to the spindle and thereby operates the ratchet gear shifting means in the gear box. Each time the apparatus is energized, one gear shifting cycle is completed and upon this apparatus being de-energized the lever arm is returned to the neutral position, being ready for the next shifting cycle.

2. Description of Prior Art

The prior art, particularly that available for motor cycles, comprises a gear shift lever arm attached to the spindle which is in turn attached to the ratchet gear shifting means. The gear shift lever arm is operated manually by the vehicle operator as in the case of a motorcycle gear box to shift gears. In a motorcycle, there is provided a gear disengaging clutch which must be operated manually to disengage the gears before the gear shift lever is operated manually to shift gears. The operator uses the toe pedal means to move the gear shift arm either up or down depending upon whether it is desired to increase or decrease the gear ratio of the motorcycle. After moving the lever it is allowed to return to the original neutral position so that shifting may be accomplished again as required. In so shifting, there is ever present the problem of shifting into the correct gear. At times, the operator fails to provide the correct force to cause the gears to be shifted either down or up as he desires, and is not then prepared for the vehicle operation in the manner contingent upon the particular gear into which it has been shifted.

The present invention replaces as desired, or augments, if desired, the manual operation of the gear shift lever arm of a motorcycle by providing a precise movement of the lever arm in a predetermined manner and through a precise arc, thus providing a more uniform and reliable means of shifting gears. Furthermore, the mere selective pressing of the electrical switching means on the handle bar is all that is required to effect the gear change, without the use of the gear disengaging clutch because the movement of the gear shifting arm is sufficiently rapid so as to not damage the gears while effecting the gear shift. The use of this invention makes possible the adaptation of motors of this type, namely ratchet type gear shifting means gear boxes to a variety of uses not heretofore possible wherein manual operation of the shifting mechanism is not possible or is prohibitively complicated in that all that is required is a source of electrical power carried by flexible wires from the switching means to the electrical drive means.

SUMMARY OF THE INVENTION

This invention provides new and novel apparatus for shifting gears in gear boxes wherein a ratchet type gear shifting means is used. The invention provides for use of an electrical drive means for accomplishing the force required to move the gear shifting lever arm through the desired rotational arc and thereafter returning said lever arm to the original neutral position so that the next gear changing stroke may be performed. The operator operates the electrical drive means by energizing said drive means to perform the shifting stroke and de-energizing said electrical drive means to return the lever arm to its original neutral position. Switching means in the form of a pair of push button-switches mounted on the handle bar operably connects said electrical drive means to an electrical power means.

An object of this invention is to provide a novel and useful means for electrically shifting gears in a gear box having a ratchet type gear shifting means. More particularly, it is an object of this invention to provide a semi-automatic electrical gear shifting apparatus for use on motorcycles having ratchet type gear shifting means.

Another object of this invention is to provide a semi-automatic electrical gear shifting apparatus for gear boxes wherein the gear shifting lever may be moved in the same plane of movement of the driven member or actuating rod of the electrical drive means.

Further objects and advantages of this invention will appear from the detailed description hereinbelow.

DESCRIPTION OF THE PREFERRED EMBODIMENTS

Figure 1:
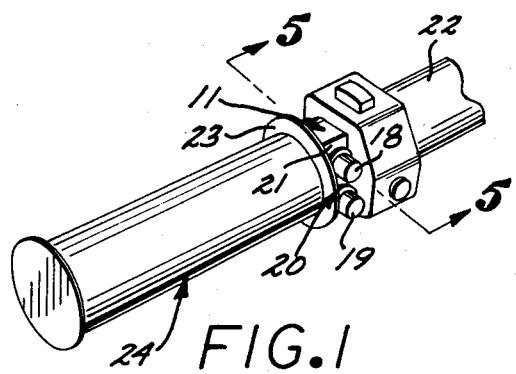
FIG. 1 is a perspective view of the handle portion of a motorcycle showing a thumb control electric switch means adjacent to the inside portion of the handle bar of the motorcycle.
Figure 2:
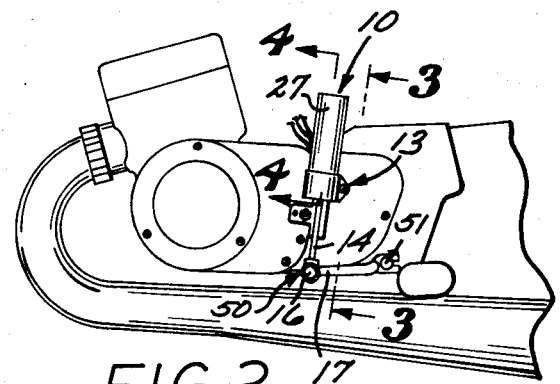
FIG. 2 is a plan view of the left side of a motorcycle engine portion showing an electrical drive gear shifting means mounted thereon having a connecting rod integral with the drive means and operably connected to the motorcycle gear shifting lever arm toe pedal, said lever arm being attached to the gear shifting spindle.
Figure 3:
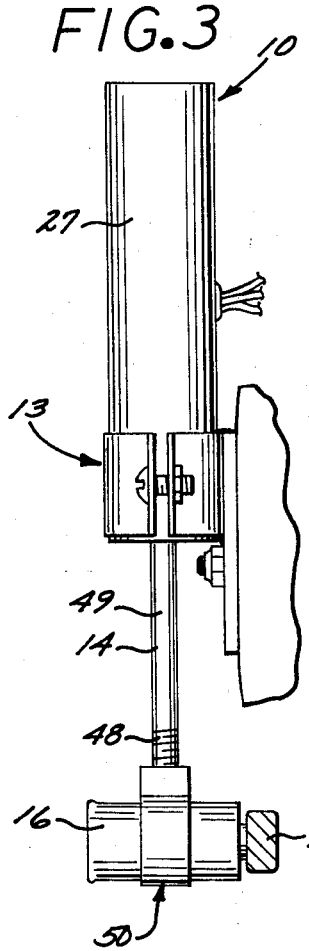
FIG. 3 is a plan view of the electical drive means mounted on the motor housing by a mounting bracket, a connecting rod being operably connected to the toe panel of the shifting lever arm, and electric wires exiting from the housing for the electric drive means.
Figure 4:
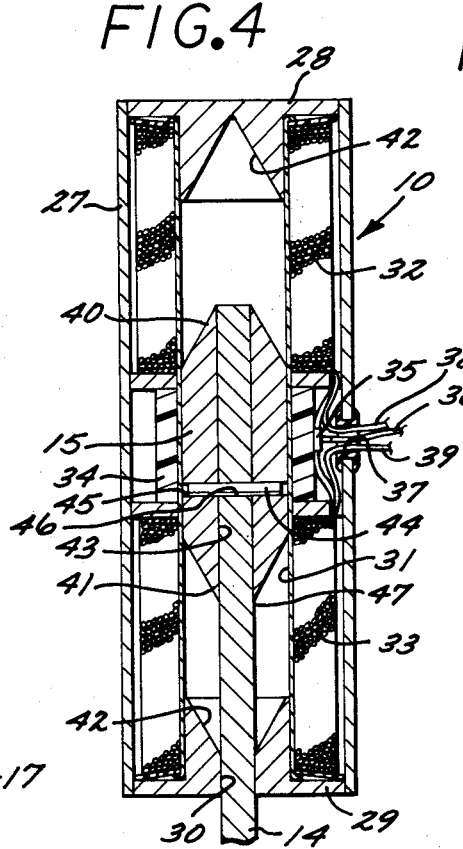
FIG. 4 is a cross-sectional view of an electrical drive means shown in FIG. 3, comprising a double acting solenoid means.
Figures 5, 6:
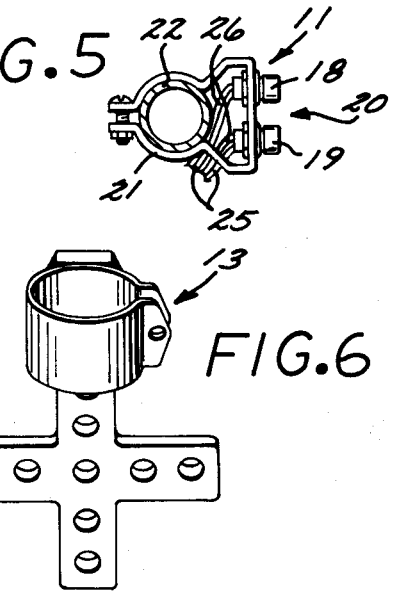
FIG. 5 is a cross-sectional view of the electrical switching means taken on line 5—5 of FIG. 1.
FIG. 6 is a perspective view of the mounting bracket for mounting the electrical drive means.
Figure 7:
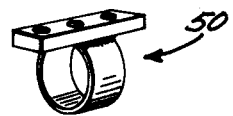
FIG. 7 is a perspective view of the connecting rod toe pedal connecting bracket.
Figure 8:
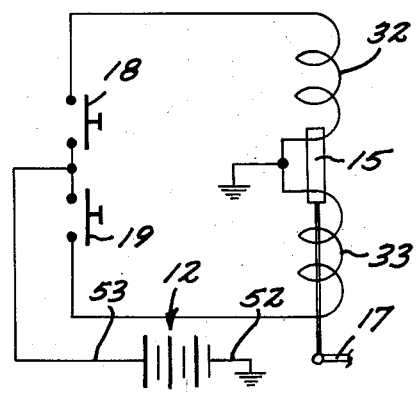
FIG. 8 is a schematic diagram of the electrical circuit of the semiautomatic electric gear shifting apparatus of FIGS. 1–5.

A preferred embodiment of the semi-automatic electric gear shifting apparatus for motor cycles is shown in FIGS. 1–8, wherein an electric drive means 10, shown in FIGS. 2, 3, and 4, comprises a double acting electric solenoid. The mechanical details of said preferred embodiment are illustrated in FIGS. 1 through 7, and the electrical schematic circuit is shown in FIG. 8. The embodiment herein comprises in combination an electrical switching means generally indicated at 11 electrically operably connected to an electrical power source 12. The double acting electrical solenoid 10 is mounted on the motorcycle engine by means of a mounting bracket 13 shown in FIG. 6, said solenoid being operable by the switching means 11. A solenoid connecting rod 14 is operably connected to a solenoid core 15 of said solenoid, said rod being operably connected at its opposite end to the toe pedal 16 of a motorcycle shifting lever arm 17, which are a standard part of any motorcycle and not, per se, part of the present invention.

The switching means is generally indicated at 20 and comprises an upper momentary contact push-button switch 18 and a lower momentary push-button switch 19 of the type wherein an electrical circuit is closed when the push-buttons 18 or 19 are depressed and opened when the push-buttons are not depressed. A switch mounting bracket 21 is mounted on a motorcycle handle bar 22 adjacent ot an inward terminating portion 23 of the bar which is generally indicated at 24. Each of the switches 18 and 19 has a power source lead wire 25 electrically attached thereto and connected to the power source 12, and each of the switches has a solenoid connecting lead wire 26.

The double acting electrical solenoid 10 is shown in detail in the cross-sectional view of FIG. 4 and comprises a cylindrical casing 27, an upper end piece 28 and a lower end piece 29 having a rod opening 30 therethrough and centrally located therein. The end pieces enclose and partially define a cylindrical casing, within which is mounted a cylindrical solenoid core guide 31 substantially smaller in diameter than said casing and having wound thereon an upper solenoid winding 32 and a lower solenoid winding 33, which windings are insulated from the casing and core guide, the core guide including a spacer 34 between the windings. The windings each have a ground lead wire 35 connected in common with each other and having a single lead wire 36 exiting through a wire exit port 37 located at about the mid-point of the casing. The upper winding has an upper switch connecting lead wire 38 and the lower winding has a lower switch connecting lead wire 39, both of which are insulated from each other and exit through said wire exit port. The solenoid core guide has a solenoid core 15 therewithin which is movable within the core guide along the direction of the major axis thereof, said core being normally located adjacent the spacer 34 and being of such dimension as to provide the desire travel when a winding is energized. The core 15 has an upper end 40 and lower end 41, both being conical in shape and of such dimension as to fit into cone shaped sockets 42 in the end pieces. The core is formed with a central opening 43 in which is inserted a solenoid connecting rod 14, said rod being affixed to said core by means of a pin 44 inserted into the core through hole 45. The pin 44 extends through an opening 46 in the rod 14 in alignment with said hole 45. The solenoid connecting rod exits through the rod opening 30 in the lower end piece 29. The rod has a core end 47, a lower rod end 48, and a shank portion 49 therebetween. The lower rod end has attached thereto a toe pedal bracket 50, said bracket being operably connected to a toe pedal 16 of a gear shifting lever arm 17, said lever arm being operably connected to a gear shifting spindle 51.

The electrical connections are made by connecting the upper switch solenoid connecting lead wire to the upper winding upper switch connecting lead wire, connecting the lower switch solenoid connecting lead wire to the lower winding lower switch connecting lead wire, connecting the solenoid winding ground lead to the power source ground lead 52, and connecting the switch power source lead wire to the power source "hot" terminal 53. Depressing the upper push-button 18 will then impart a clockwise rotation to the gear shifting spindle, the length of arc being determined by the length of the travel of the core within the solenoid. Depressing the lower push-button 19 will impart a counter clockwise rotation to the gear shifting spindle, the length of arc determined as aforesaid. Releasing either push-button causes the spindle to return to its neutral position. The appropriate push-button is operated alternately until the desired gear ratio is achieved on the motorcycle.

Figures 9, 10:
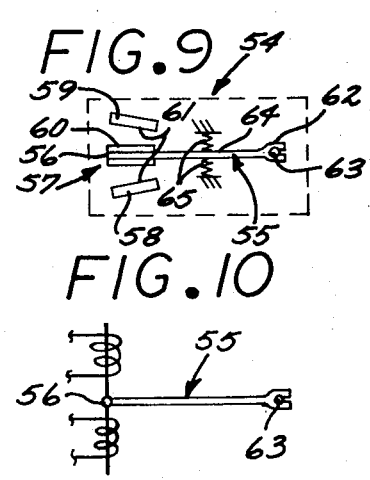
FIG. 9 is a diagram of an alternate electric drive means being operable similarly to a double acting electric relay wherein the gear shifting lever arm is comparable to the switching arm of a relay.
FIG. 10 is a schematic drawing of the electric drive means shown in FIG. 9.
Figure 11:
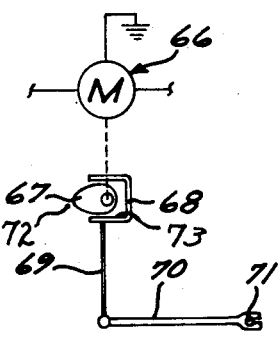
FIG. 11 is a diagrammatic view showing a modified electric drive means wherein said drive means comprises a reversible electric motor having connected to the rotor shaft thereof an eccentric rotor member for moving the shifting lever arm.

Other embodiments of the electrical drive means are shown in FIGS. 9–10, and FIG. 11. In FIG. 9, the electrical drive means comprises a double acting relay type solenoid shown schematically at 54 wherein a gear shifting lever arm 55 is so constructed that it is directly acted upon by the energized solenoid coil. The lever arm 55 has a forward end 56 being located in a neutral position 57 intermediate between a lower solenoid pole piece 58 and an upper solenoid pole piece 59. The forward end of the arm has secured thereto a highly magnetically permeable metal means 60 shaped to match the said pole pieces as to dimensions of mating surfaces 61 thereof. The arm 55 has a rearward end spindle clamping means 62 thereon clamped to a gear shifting spindle 63. Opposing spring means 65 engage opposite sides of shank portion 64 of the lever arm 55 approximately mid-point thereon, said spring means providing the force to maintain the arm 55 in a neutral position mid-way between said pole pieces when the solenoid coils are not energized.

FIG. 10 shows the schematic circuit and a diagram of the FIG. 9 embodiment. As can be observed, when one of the respective pole piece windings is energized, the magnetically permeable metal plate means 60 on the lever arm is drawn theretoward thereby imparting a rotational motion to the gear shifting spindle. Upon de-energizing the solenoid coil, the spring means causes the lever arm to return to its neutral position. Each time the coil is energized, the shift in gear ratio is accomplished within the design parameters of the gear mechanism of the motorcycle.

A third embodiment is shown in FIG. 11 wherein a reversible motor means 66 has operably connected thereto a rotatable eccentric wheel gear 67 positioned in a channel member 68. The latter is operably connected to a connecting rod 69 operably connected to a gear shifting lever arm 70 which in turn is operably connected to the gear shifting spindle 71. Energizing the motor to operate in a clockwise direction causes the peak 72 of the eccentric wheel gear to rotate in the channel 68 resulting in upward movement of the channel and rod 69 connected thereto, thereby causing the spindle to rotate in a clockwise direction. Reversing the motor causes the spindle to rotate in a counter clockwise direction as a result of the peak 72 of the eccentric gear engaging the lower surface 73 of said channel, thereby effecting rotation of the spindle in a counter clockwise direction.

I claim:

1. A semi-automatic electrical gear shifting apparatus for a motorcycle for shifting gears of a ratchet type gear shifting means comprising in combination:
   a. an electrical switching means comprising a pair of switches mounted on the handle bar of the motorcycle, said switching means being electrically operably connected to
   b. an electrical power source,
   c. electrical drive means electrically connected to said power source through said switches, said electrical drive means including a solenoid, an actuating rod operatively connected to said solenoid, said actuating rod in turn being connected to a gear shifting lever arm through a toe pedal of the motorcycle, said lever arm being connected to a gear shifting spindle of the motorcycle gear mechanism, the connection between said lever arm and said spindle being such that when one of said switches is actuated said lever arm is moved by said solenoid to rotate said spindle in a first direction to change gears and when the other of said switches is activated said lever arm is moved by said solenoid to rotate said spindle in a second direction to change gears.

2. A semi-automatic electrical gear shifting apparatus as set forth in claim 1 wherein said switching means is mounted on a clamp mounted near an inward terminating end of the handle bar handle, said drive means comprising a double ended electrical solenoid, said solenoid having an upper winding electrically operably connected to one of said switches, and a lower winding electrically operably connected to the other of said switches, the electrical operation of said windings being independent of each other, said solenoid being mounted on a bracket mounted on the motorcycle engine above said toe pedal, said solenoid including a core movably located within said solenoid and operably connected to said actuating rod, said actuating rod having a toe pedal clamp means connected thereto at its lower end, with said toe pedal clamp means in turn being secured to said toe pedal.

3. A semi-automatic electrical gear shifting apparatus for a motorcycle for shifting gears of a ratchet type gear shifting means comprising in combination:
   a. an electrical switching means comprising a pair of switches mounted on the handle bar of the motorcycle, said switching means being electrically operably connected to
   b. an electrical power source,
   c. electrical drive means electrically connected to said power source through said switches, said electrical drive means comprising a double-acting relay type solenoid having an upper pole piece and a lower pole piece, a gear shifting lever arm positioned between said pole pieces, said lever arm having mounted at its forward end a magnetically permeable metal plate means, said plate means having upper and lower surfaces shaped to mate with said upper and lower pole pieces, the rearward end of said lever arm being clamped to a gear shifting spindle, spring means engaging both sides of said lever arm intermediate the ends thereof, said spring means providing a force to maintain said lever arm in a neutral position located intermediate between said solenoid pole pieces, said switches when alternately actuated moving said lever arm toward one or the other of said pole pieces thereby rotating said spindle in the corresponding direction.

4. A semi-automatic electrical gear shifting apparatus for a motorcycle for shifting gears of a ratchet type gear shifting means comprising in combination:
   a. an electrical switching means comprising a pair of switches mounted on the handle bar of the motorcycle, said switching means being electrically operably connected to
   b. an electrical power source,
   c. electrical drive means electrically connected to said power source through said switches, said electrical drive means comprising a reversible electric motor, a rotatable eccentric wheel gear driven by said motor, a channel member within which said wheel gear is mounted, said channel member being rigidly connected to a shifting lever arm through a connecting rod, said lever arm in turn being connected to a gear shifting spindle, whereby actuation of one of said switches results in rotation of said eccentric wheel gear in one direction to correspondingly rotate said spindle, and actuation of the other of said switches rotates said eccentric wheel gear in the opposite direction for corresponding reverse rotation of said spindle.

* * * * *